(12) United States Patent
Fogliati et al.

(10) Patent No.: US 10,000,044 B2
(45) Date of Patent: Jun. 19, 2018

(54) PANEL FOR MAKING FURNISHINGS SUCH AS DOORS, BOARDS, TABLES, FURNITURE OR THE LIKE

(75) Inventors: Massimiliano Fogliati, Turin (IT); Raffaella Giovannini, Piscina (IT); Sandro Marcarino, Frossasco (IT)

(73) Assignee: RENOLIT GOR S.P.A., Buriasco (TO) (IT)

( * ) Notice: Subject to any disclaimer, the term of this patent is extended or adjusted under 35 U.S.C. 154(b) by 1028 days.

(21) Appl. No.: 13/383,573

(22) PCT Filed: Jul. 14, 2010

(86) PCT No.: PCT/EP2010/060118
§ 371 (c)(1),
(2), (4) Date: Feb. 6, 2012

(87) PCT Pub. No.: WO2011/006918
PCT Pub. Date: Jan. 20, 2011

(65) Prior Publication Data
US 2012/0121863 A1    May 17, 2012

(30) Foreign Application Priority Data
Jul. 15, 2009 (IT) .............................. GE2009A0053

(51) Int. Cl.
*B32B 3/00* (2006.01)
*B32B 27/20* (2006.01)
(Continued)

(52) U.S. Cl.
CPC ............ *B32B 27/20* (2013.01); *A47B 96/206* (2013.01); *B32B 3/28* (2013.01); *B32B 3/30* (2013.01);
(Continued)

(58) Field of Classification Search
CPC ..... Y10T 428/24124; Y10T 428/24529; Y10T 428/24537; Y10T 428/24554; Y10T 428/24612; A47B 96/206; B32B 27/20
See application file for complete search history.

(56) References Cited

U.S. PATENT DOCUMENTS 2,961,332 A * 11/1960 Nairn .......................... C08J 9/06
156/78
3,808,024 A *  4/1974 Witman ........................ 428/187
(Continued)

FOREIGN PATENT DOCUMENTS

EP    1 088 652    4/2001
WO    2001/096256   12/2001

OTHER PUBLICATIONS

PCT Search Report of International Application PCT/EP2010/060118 filed on Jul. 14, 2010 in the name of Massimiliano Fogliati et al.
(Continued)

*Primary Examiner* — Donald J Loney
(74) *Attorney, Agent, or Firm* — Steinfl + Bruno, LLP

(57) ABSTRACT

Panel, particularly a panel used for making furnishings such as doors, boards, tables, furniture or the like, which panel on at least one face thereof has at least a three-dimensional structure and which panel is composed of a mechanically rigid base or supporting sheet and a coating sheet for giving the aesthetic appearance to said panel, said coating sheet being superposed on at least one face of the base sheet, wherein the compound of said coating sheet is composed of thermoplastic polymers mixed with a vegetable and/or mineral filler, which compound gives such flexibility properties to the coating sheet that said coating sheet can be wound on itself.

13 Claims, 6 Drawing Sheets

Figure 1:
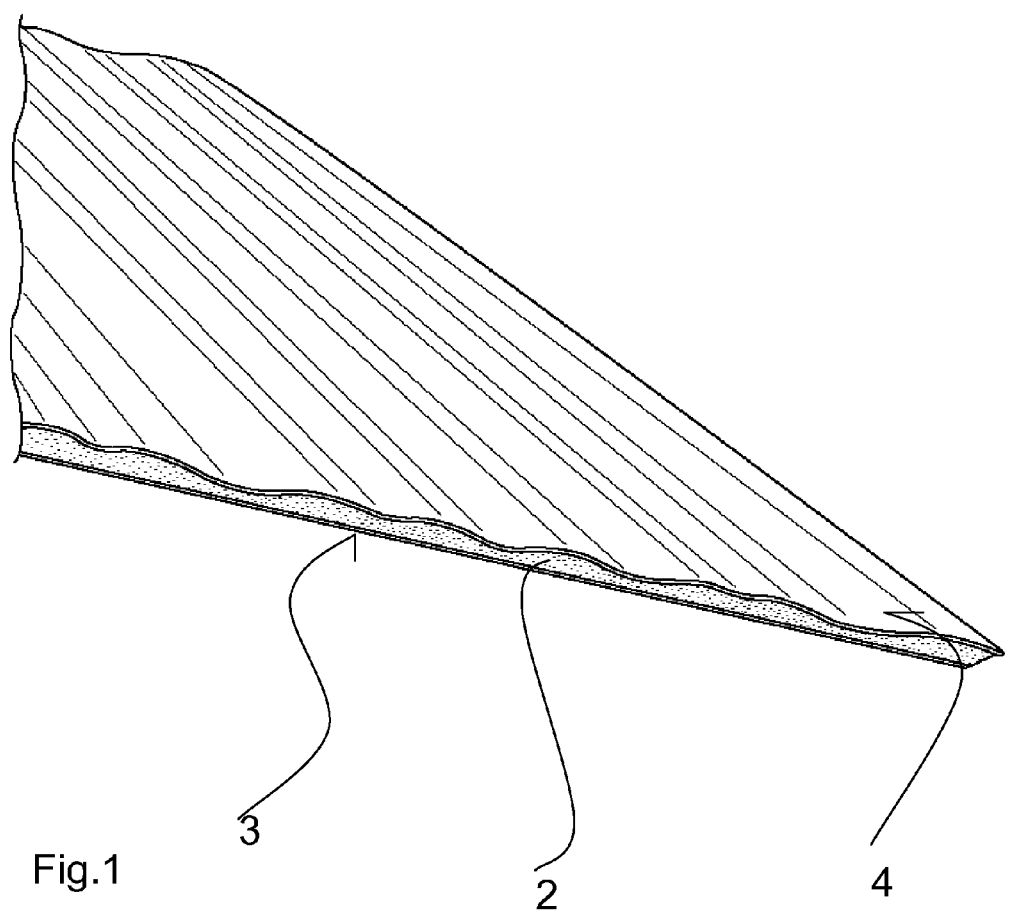

(51) Int. Cl.
| | |
|---|---|
| A47B 96/20 | (2006.01) |
| B32B 5/02 | (2006.01) |
| B32B 5/08 | (2006.01) |
| B32B 5/20 | (2006.01) |
| B32B 5/22 | (2006.01) |
| B32B 5/24 | (2006.01) |
| B32B 7/12 | (2006.01) |
| B32B 21/04 | (2006.01) |
| B32B 21/06 | (2006.01) |
| B32B 21/08 | (2006.01) |
| B32B 21/10 | (2006.01) |
| B32B 25/02 | (2006.01) |
| B32B 25/06 | (2006.01) |
| B32B 25/10 | (2006.01) |
| B32B 27/10 | (2006.01) |
| B32B 27/12 | (2006.01) |
| B32B 27/32 | (2006.01) |
| B32B 29/00 | (2006.01) |
| B32B 3/28 | (2006.01) |
| B32B 3/30 | (2006.01) |

(52) U.S. Cl.
CPC ............... *B32B 5/022* (2013.01); *B32B 5/08* (2013.01); *B32B 5/20* (2013.01); *B32B 5/22* (2013.01); *B32B 5/245* (2013.01); *B32B 7/12* (2013.01); *B32B 21/045* (2013.01); *B32B 21/047* (2013.01); *B32B 21/06* (2013.01); *B32B 21/08* (2013.01); *B32B 21/10* (2013.01); *B32B 25/02* (2013.01); *B32B 25/06* (2013.01); *B32B 25/10* (2013.01); *B32B 27/10* (2013.01); *B32B 27/12* (2013.01); *B32B 27/205* (2013.01); *B32B 27/32* (2013.01); *B32B 29/007* (2013.01); *B32B 2262/02* (2013.01); *B32B 2262/06* (2013.01); *B32B 2262/067* (2013.01); *B32B 2262/14* (2013.01); *B32B 2264/06* (2013.01); *B32B 2264/10* (2013.01); *B32B 2266/025* (2013.01); *B32B 2266/0207* (2013.01); *B32B 2270/00* (2013.01); *B32B 2272/00* (2013.01); *B32B 2307/402* (2013.01); *B32B 2307/50* (2013.01); *B32B 2307/546* (2013.01); *B32B 2419/00* (2013.01); *B32B 2479/00* (2013.01); *Y10T 156/1041* (2015.01); *Y10T 428/24124* (2015.01); *Y10T 428/24479* (2015.01); *Y10T 428/24529* (2015.01); *Y10T 428/24537* (2015.01); *Y10T 428/24554* (2015.01); *Y10T 428/24612* (2015.01)

(56) References Cited

U.S. PATENT DOCUMENTS

| | | | | |
|---|---|---|---|---|
| 4,240,857 | A * | 12/1980 | DellaVecchia | B29C 70/00 156/209 |
| 4,773,959 | A * | 9/1988 | Smith | B29C 59/046 156/220 |
| 4,853,276 | A * | 8/1989 | Kurushima | 428/187 |
| 5,919,575 | A * | 7/1999 | Bowns et al. | 428/537.5 |
| 6,684,586 | B1 * | 2/2004 | Hoffmann, Sr. | E04F 13/042 52/255 |
| 2002/0139082 | A1 * | 10/2002 | DeFord | E04C 2/04 52/783.1 |
| 2006/0099405 | A1 * | 5/2006 | Guiselin | B32B 3/04 428/323 |
| 2007/0065662 | A1 | 3/2007 | Bennett et al. | |
| 2008/0263985 | A1 * | 10/2008 | Hasch | B44C 5/043 52/506.01 |
| 2009/0098332 | A1 * | 4/2009 | Han | B27N 3/00 428/114 |

OTHER PUBLICATIONS

PCT Written Opinion of International Application PCT/EP2010/060118 filed on Jul. 14, 2010 in the name of Massimiliano Fogliati et al.

\* cited by examiner

PANEL FOR MAKING FURNISHINGS SUCH AS DOORS, BOARDS, TABLES, FURNITURE OR THE LIKE

CROSS REFERENCE TO RELATED APPLICATIONS

The present application is the US national stage of International Application PCT/EP2010/060118 filed internationally on Jul. 14, 2010, which, in turn, claims priority to Italian Patent Application GE2009A000053 filed on Jul. 15, 2009.

The invention relates to a panel particularly a panel used for making furnishings such as doors, boards, tables, furniture or the like, which panel on at least one face thereof has at least a three-dimensional structure and which panel is composed of a mechanically rigid base or supporting sheet, and a coating sheet for giving the aesthetic appearance to said panel, said coating sheet being superposed on at least one face of the base sheet.

It is known to use panels for making doors, boards, tables or furniture generally made of hardboard, plywood, wood or the like. It is possible to use for example MDF (Medium Density Fiberboard) panels that is panels obtained by pressing a mat of wood fibers making it homogeneous through all its thickness, with a smooth and not so much porous surface, or OSB (Oriented Strand Board) panels that is wood panels made with synthetic resins and with thin veneers (strands). Strands are pressed into 3-4 layers: strands of the external layers are generally oriented lenghtwise with respect to the length of the panel, while other strands of middle layers are usually cross-oriented, which panels have on at least one face thereof projecting or recessed three-dimensional structures to give the furniture a particular aesthetic appearance.

Said three-dimensional structures that is embossments on the panels, can be obtained by directly processing the panel, which processing has drawbacks related to the time-consuming manufacturing and to the use of people skilled in the art, this making said panels particularly expensive. The fact of directly processing the panel requires the use of apparatuses capable of exerting strong pressures on the panel such to create the three-dimensional pattern.

As an alternative it is known to use decorative embossed films directly applied on the panel made of hardboard, plywood, wood, MDF, OSB.

Said films are usually multilayered films and with a total thickness of about 200-300 μm therefore it is not possible for them to be deformed/stretched too much in order to be embossed without running the risk of being torn.

The fact of applying said embossed decorative films, due to their small thickness, leads to reduced embossing depths, not exceeding 400 μm.

Such embossing process for decorative films is slow, expensive and it requires particularly high investment costs. Moreover it cannot be employed for producing any type of furniture or furnishing equipment since it causes the panel to be provided with three-dimensional structures having a reduced height or depth.

Therefore according to known techniques in order to obtain a deep embossing it is necessary to engrave the drawing directly on the panel made of hardboard, plywood, wood, MDF, OSB by using specific apparatuses causing the process to be slow and expensive.

According to known techniques in order to obtain a panel with embossing depths greater than 300-400 μm it is necessary for the supporting sheet to which the decorative film is applied, that is the panel made of hardboard, plywood, wood, MDF, OSB, to be embossed too. This leads to the use of specific and expensive apparatuses, such as pantographes and presses capable of exerting strong pressures on the wood panel and to of deeply deforming the panel and the film in order to obtain the embossing pattern with the desired characteristics. Costs for such processing are high and it is time consuming to obtain a finished panel.

Moreover said apparatuses used for making deep embossments are not available for manufacturers of panels for furnishings or furniture since usually such manufacturers have apparatuses capable of processing thin films and of compressing such films which are already provided with embossments such to adhere them on a supporting panel that does not require to be deformed.

Moreover, in the case of deep embossments, it is not possible to have a continuous production but individual panels are produced in sequence with predetermined or finite dimensions.

The aim of the present invention is to make a panel, particularly a panel used for making furnishings such as doors, boards, tables, furniture or the like, which panel on at least one face thereof has very deep three-dimensional structures by applying on a base or supporting sheet a coating sheet, and possibly by applying, upon said coating sheet, a decorative film, thus said coating sheet and said film giving a considerable aesthetic three-dimensional appearance to the finished product.

The aim of the present invention is also to provide a process for making said panels characterized in that they have external embossed faces with a rather deep embossing pattern, which process is rapid, inexpensive and easy to carry out.

A further aim of the present invention is a process for making panels rapidly and inexpensively by continuously producing coating sheets, for example by using extruders with embossed barrels, which coating sheets have such flexibility properties that said sheets can be wound on themselves. The embossed coating sheet or sheets produced by the process of the present invention can be stored as coils, that is wound on themselves, or as one or more plates which are precut according the desired dimensions. Then said sheets, during the process for producing the panel can come to adhere with the smooth face, that is free from embossments, to the base or supporting sheet.

The above aims are achieved by providing a panel having on at least one face thereof at least a three-dimensional structure and which panel is composed of a base or supporting sheet, making the panel rigid, and a coating sheet, in order to give said panel the aesthetic appearance, said coating sheet being superposed on at least one face of the base sheet, and wherein the compound of said coating sheet is composed of thermoplastic polymers mixed with a vegetable and/or mineral filler.

The compound gives such flexibility properties to the coating sheet that said coating sheet can be wound on itself.

Said coating sheets are obtained by means of a process extruding thermoplastic polymers, which polymers are preferably polyolefin polymers and particularly polypropylene or polyethylene or a mixture of said two polymers.

A vegetable and/or mineral filler is added to said thermoplastic compound which vegetable filler can be composed of long and/or short wood fibers and/or flour, and/or cork flour and/or other vegetable fibers such as for example cellulose, hemp, jute, coco, kenaf, flax, ramie, abaca, sisal, curaua, palm, cabuya, opuntia, kapok fibers and other types of like fibers, while the mineral filler is preferably composed of inorganic fillers such as talc, calcium carbonate, barium sulphate, silica or silicates.

The use of vegetable fibers, in their not minced or crushed condition, allows coating sheets to have a reduced weight and at the same time such mechanical stiffness characteristics to give strength and shape stability to said coating sheets. The use of vegetable flours and/or fibers allows the material of the sheets to be recycled, thus considerably increasing the eco-compatibility of the composite material of the coating sheets.

In order to obtain coating sheets having particular softness characteristics facilitating the embossing process and the fit of said coating sheet to the face of the base or supporting sheet and a certain flexibility allowing said sheets, if necessary, to be wound on themselves, it is possible to add a certain amount by weight of thermoplastic rubber to the above mentioned compound.

Particularly it is possible to use thermoplastic elastomers, so called TPEs, being a family of "rubber-like" materials that combine the best characteristics of thermosetting rubber with the processing advantages of thermoplastics to offer a flexible and recyclable material.

Like thermoplastic polymers, TPEs become free-flowing when heated and regain their original structure and stability when cooled. Unlike the chemical cross-linking typical of thermosetting rubbers, TPE involves purely physical cross-linking, which can be easily reversed via a further application of heat. Such characteristic makes it possible to re-use production waste and therefore end of life products made of said thermoplastic rubbers can be easily reprocessed and recycled.

The elasticity of TPEs is similar to that of rubber, with a wide range of softness or hardness values, therefore they are available as ultra-soft rubber material and as very rigid material.

According to a further version, a compatibilizing and/or waterproofing agent can be added to the compound used for making the coating sheet such to make the non polar matrix of the polyolefin compatible with a non polar filler, such as for example the vegetable flour and/or fiber.

The compatibilizing agent of the plastic material, and particularly of the polypropylene matrix, with the vegetable and/or mineral filler improves the bonding between vegetable flours and/or fibers and the matrix of plastic material.

Organic molecules with hydrophilic substituents can be used as the compatibilizing agent i.e. silane or organo-silane, zircoaluminate or aluminate compounds or particularly maleic anhydride-modified polyolefins.

According to a further variant embodiment, in order to have a light sheet and therefore a light panel with particular softness characteristics, while reducing at the same time the use of the most expensive components of the compound of the coating sheet, i.e. reducing the amount of thermopolymers and/or thermoplastic rubbers added to the compound of said sheet, it is possible to add physical and/or chemical blowing agents for foaming the sheet during the forming process, such as carbon dioxide, nitrogen, helium, $H_2O$, HFC, butane and low boiling point hydrocarbon compounds.

Several gases, such as carbon dioxide or nitrogen or other gases typically used for the foaming processes and chemically compatible with the components of the material compound of the sheet can be used as the physical blowing agent.

Physical agents can be injected into the bulk, composed of the mixture of polypropylene and vegetable flours and/or fibers, stored into the extruder and particularly into the barrel of the extruder barrel, thus directly foaming the sheet during the extrusion process.

Chemical agents can be added to the mixture of polypropylene and vegetable flours and/or fibers into the extruder.

In this case the amounts used are those typically used for achieving predetermined foaming conditions.

A colouring master or a mixture of colouring masters can be added to the compound described above to give the product a specific colour depending on the final application of the finished panel.

The process for forming panels according to the present invention provides coating sheets obtained by extruding above mentioned compounds to be applied, by gluing, on at least one face of a base or supporting sheet composed of hardboard, plywood, wood or the like. In order to facilitate the adhesion of the coating sheet on a base or supporting sheet it is possible to provide said coating sheet to be locally heated in order to facilitate the adhesion on the base or supporting sheet. The coating sheet is heated such that it is slightly thermoformed allowing the coating sheet to take a shape matching the base or supporting sheet upon which it is applied.

The term locally heated means the heating of one or more locations or areas of the surface of the coating sheet intended to contact and adhere to the base sheet such to have the coating sheet not completely softened but to have one or more superficially softened and/or melted locations and/or areas thereof in order to facilitate a chemical-physical bonding of materials constituting the base sheet and the coating sheet.

Said coating sheet due to its flexibility properties can adhere both to smooth surfaces of the base sheet and to surfaces having projecting or recessed two-dimensional or three-dimensional structures and having a curved configuration: the coating sheet follows the profile of the surface, provided or not with recessed or projecting structures, of the base sheet upon which it is applied such to perfectly adhere to said surface.

In order to facilitate the adhesion between the rigid base sheet and the coating sheet a bonding layer such as for example a nonwoven fabric composed of vegetable and/or synthetic fibers and/or a combination thereof is provided.

In addition to the possibility of subjecting said coating sheets to thermoforming processes, before or after being applied to the base sheet, they can be subjected to a deep embossing process, with depths ranging from 200 μm to 3 mm particularly with embossing depths ranging from 500 μm to 1.5 mm.

The deep embossing, obtained without using apparatuses capable of exerting strong pressures, is achieved by means of softness and flexibility properties of the coating sheet which depend on its composition.

The embossing depth depends on the thickness of the coating sheet applied on the base sheet to obtain the finished panel.

Moreover, for ennobling the panel, the embossed coating sheets on their clear face can be joined to a decorative film for enhancing the visual impact characteristics of the finished panel.

Said decorative films can be joined to the coating sheet both during the manufacturing of the embossed coating sheet, and in a subsequent step, also after joining the coating sheet to the base sheet by a gluing process.

The deep embossing in combination with the decorative film allows the panel to have any appearance, for example a wood-effect, processed wood or to have any geometrical or artistic pattern on at least one face of said panel, without using expensive raw materials or long and complicated processes. Moreover the deep embossing allows the panel to be provided with a considerable three-dimensional effect.

The panel of the present invention therefore provides the use of a coating sheet made of plastic material which is capable of supporting the deep embossing process due to its flexibility properties and its thickness, which coating sheet has a face with deep embossments made thereon, and which can be further ennobled by providing a decorative film, and a smooth, not embossed face which is placed in contact with and adherent to a mechanically rigid base or supporting sheet, such to have a finished panel with such aesthetic and mechanical characteristics to be used in making furnishings or the like.

Therefore the present invention provides a panel with deep embossments to be obtained by exploiting flexibility properties of the sheet made of plastic material of the present invention and strength properties of the base or supporting sheet.

The easiness of embossing and flexibility properties, of the coating sheet, depend on its composition according to the present invention.

The use of a coating sheet, that can be interposed between a decorative film and the wood supporting sheet, allows time and costs for the production of furnishing panels to be reduced since it makes possible to use processes and apparatuses equal to or similar to those used for embossing decorative films with a small thickness, without the need of having apparatuses capable of engraving drawings on the mechanically rigid supporting sheet, therefore allowing finished panels with considerably deep embossments to be obtained which panels can be made by applying the coating sheet, with or without the decorative film, on the rigid supporting sheet by means of a continuous, line process, namely a process equal to or similar to that used for applying thin decorative films on supporting sheets.

Deformability and flexibility properties of the coating sheet of the present invention not only allow said coating sheet to be fold and wound on itself, but it makes also possible to use for said sheet the same apparatuses and the same processes for the application on supporting sheets as those used for applying thin embossed films and which apparatuses and which processes are currently used for making embossed furnishing panels. This allows finished panels with deep embossments to be obtained with reduced costs and within shorter time.

Without using a coating sheet it is not possible to have a deep embossing since used films cannot be deeply engraved without the risk of tearing the film due to the small thickness thereof. As an alternative, in order to have deep embossments the base supporting sheet has to be engraved by using expensive apparatuses and long lasting processes considerably increasing the final cost of the finished panel.

By the present invention a laminated coating sheet is provided having a deeper embossing than that conventionally applied to films, capable of providing a support for said decorative films, and since said coating sheet is compressible, it advantageously keeps a smooth face to be applied to the base and supporting sheet and a deformed face. Since said coating sheet is soft and deformable the force used for making deep embossments is lower than the one that should be exerted to the base supporting rigid sheet in order to obtain the same type of embossing, in the case the coating sheet is not provided.

Moreover said coating sheets, with or without decorative films, can be laminated and embossed in a continuous way, with processes and apparatuses equal to or similar as those used for processing thin decorative films, from coils or precut plates such to have a rapid and inexpensive production of furnishing panels.

Said processing can be obtained by means of the flexibility of the coating sheet which is achieved by the specific composition, according to the present invention.

Moreover the flexibility of the coating sheet allows it to fit and adhere to surfaces having any pattern that is to surfaces of supporting sheets which are smooth or provided with projections or recesses.

Further characteristics and improvements are object of the claims.

Figure 2:
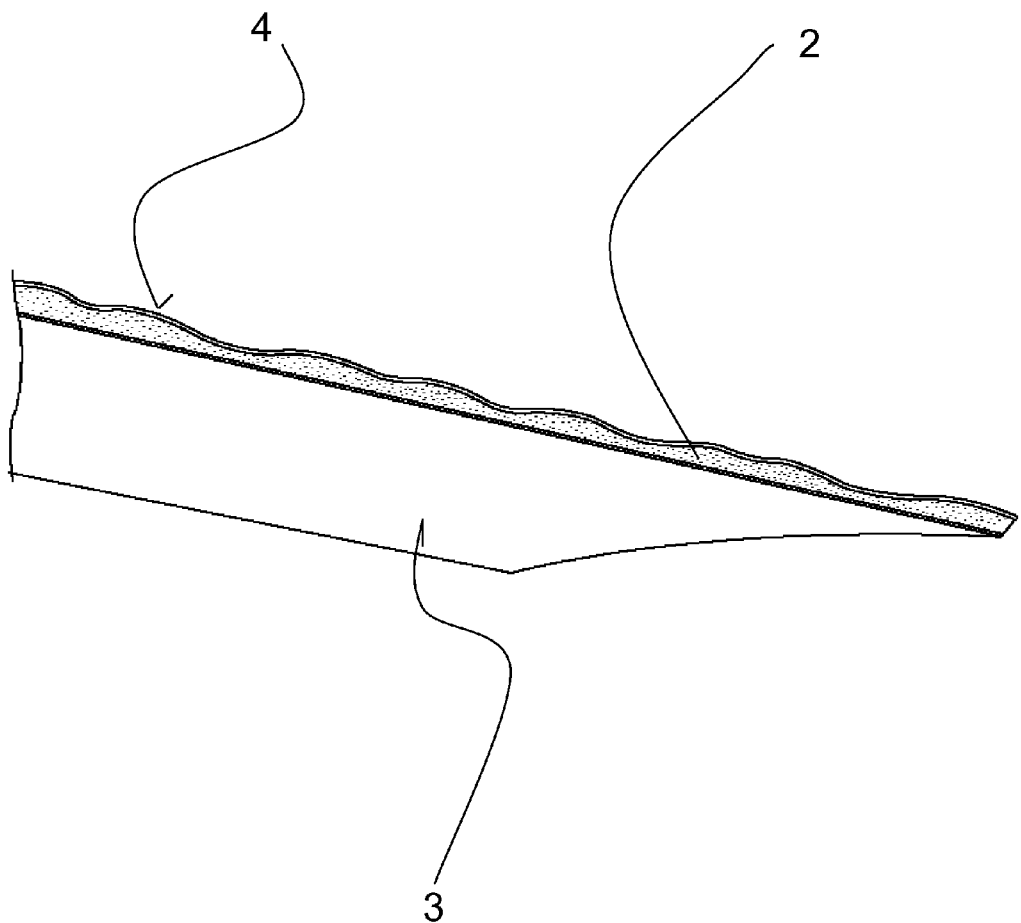
Figure 3:
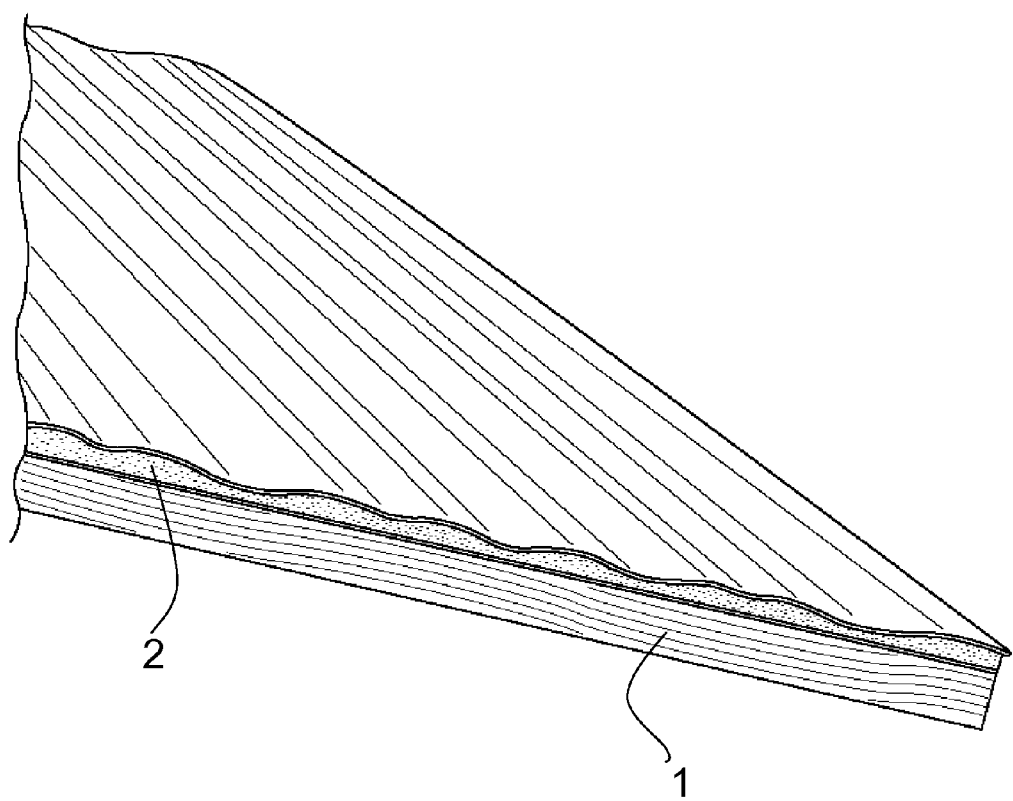
Figure 4:
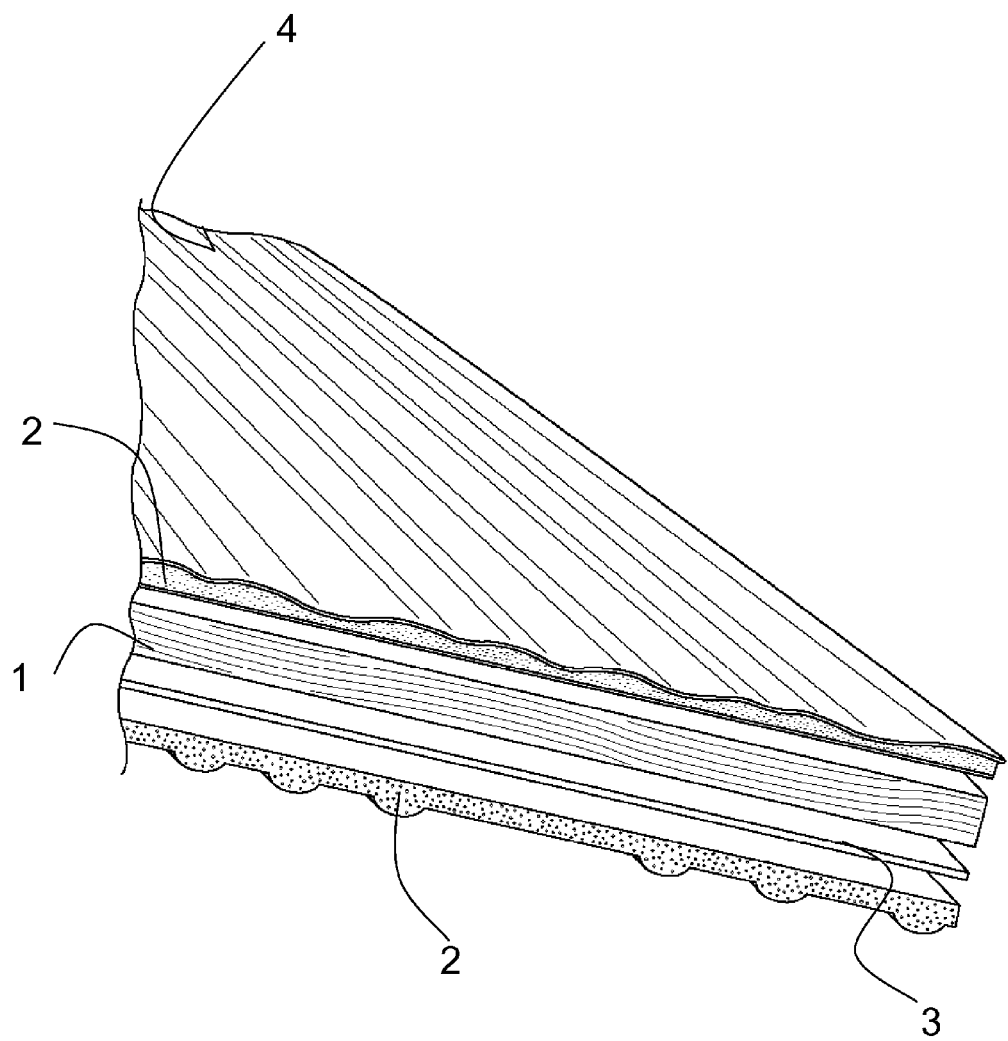
Figure 5:
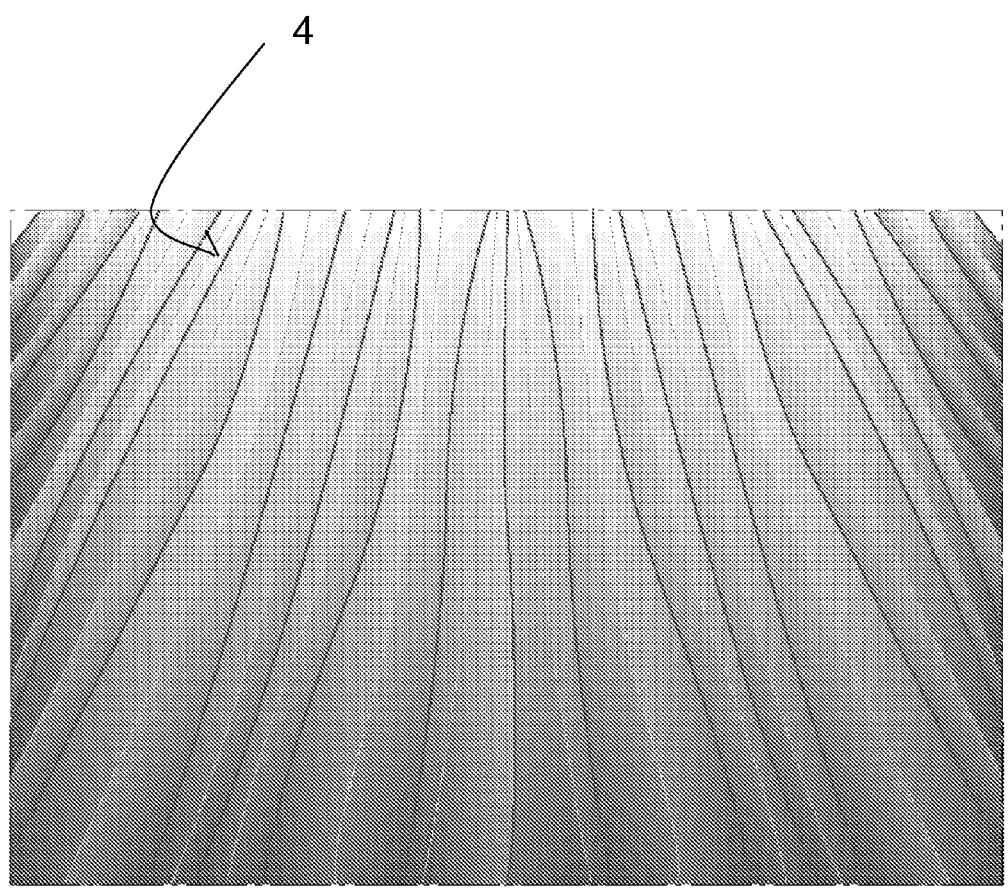

These and other characteristics and advantages of the present invention will be more clear from the following description of some embodiments shown in annexed drawings wherein:

FIG. 1 is a sectional view showing a coating sheet for the panel according to the present invention, at least one face joined to a decorative film and the opposite face joined to a layer of nonwoven fabric, FIG. 2 is a sectional view showing a coating sheet for the panel according to the present invention, with the layer of nonwoven fabric highlighted, FIG. 3 is a sectional view showing the coating sheet and the base sheet constituting the panel according to the present invention, FIG. 4 is a sectional view showing elements constituting a panel according to a variant of the present invention, wherein each face of the base sheet is joined to a non woven fabric layer and to an embossed coating sheet, which sheet or sheets can be provided with a decorative film applied on the clear face, FIG. 5 is an example of an artistic pattern that can be obtained by embossing the clear face of the coating sheet.

Figure 6:
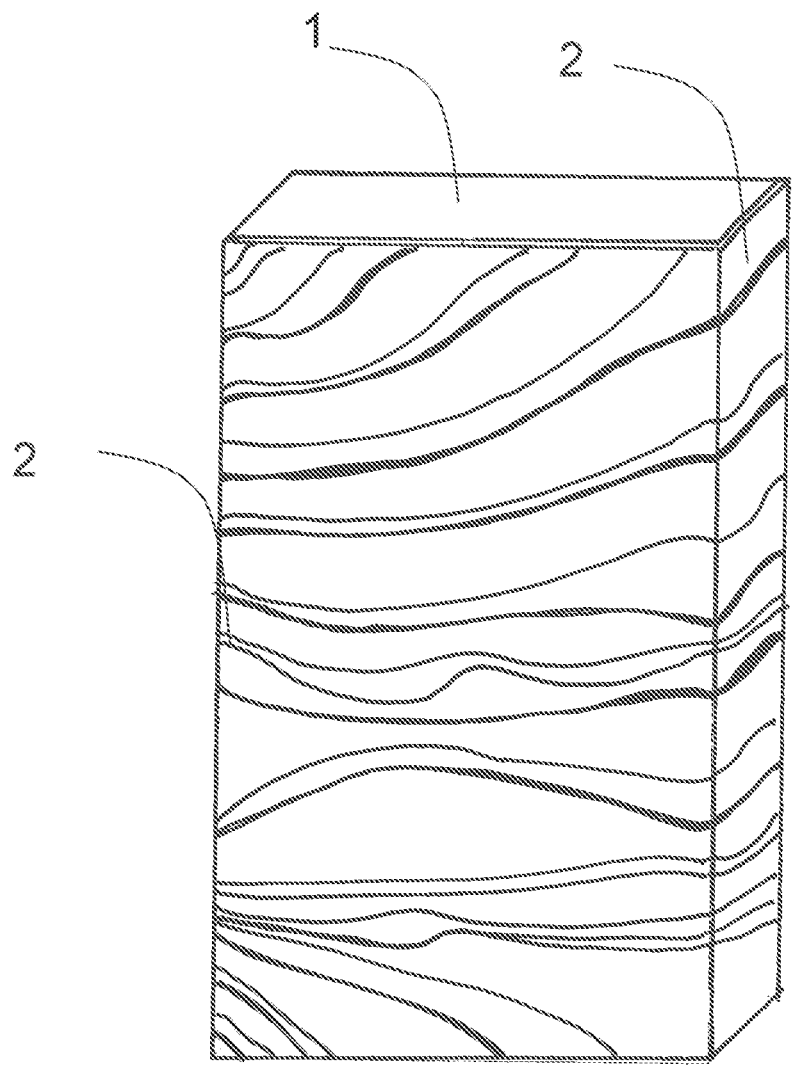

FIG. 6 is a panel according to a variant of the present invention, wherein the coating sheet covers at least a side and/or end edge of the base sheet.

Such as shown in figures the panel for making doors, boards, tables, furniture or the like is composed of a base or supporting sheet 1 giving mechanical strength to the panel and of at least a coating sheet 2 joined to at least one face of said base sheet 1 preferably by gluing it.

In order to contribute to the adhesion of said coating sheet 2 and said base sheet 1 it is possible to provide between said sheets a bonding layer 3 such as for example a nonwoven fabric composed of vegetable and/or synthetic fibers and/or a combination thereof and/or paper or any other element able to help the adhesion.

The base sheet 1 is composed of any natural and/or synthetic materials or a combination of such materials used for making furnishing equipment, such as for example wood panels, hardboard, plywood, MDF panels or OSB panels, such as defined above.

The coating sheet 2 is composed of thermoplastic polymers mixed with a vegetable and/or mineral filler.

Particularly thermoplastic polymers of the coating sheet 2 are polyolefin-based ones and are composed of polypropylene or polyethylene or mixtures of said two polymers.

The mineral filler is preferably composed of talc or calcium carbonate or barium sulphate or silica or silicates or mixtures thereof while the vegetable filler, in the powder form or as not crushed or minced fibers, is composed of wood fiber or flour, cork flour or vegetable fibers such as for example cellulose, hemp, jute, coco, kenaf, flax, ramie, abaca, sisal, curaua, palm, cabuya, opuntia, kapok fibers and other types of like fibers.

According to an embodiment the standard compound of the coating sheet 2 is composed of a polyolefin matrix with a percentage of vegetable filler ranging from 0 to 60% and of mineral filler ranging from 0 and 50% mixed therein.

In order to reduce the weight of the finished panel, to reduce the use of the above materials and/or in order to give the coating sheet 2 particular softening characteristics, it is possible to add to the compound for making said coating sheet 2 a gas or any other endothermic and/or exothermic and/or physical chemical blowing agent added as standard amounts for foaming processes and which amounts change depending on the type of agent.

Typically the following ones are particularly used as gases causing the foaming, but they are not limited thereto: carbon dioxide, nitrogen, helium, $H_2O$, HFC, butane and low boiling point hydrocarbon compounds, or other gases typically used in foaming processes and which are chemically compatible with the components of the material compound composing the coating sheet 2.

Such chemical and/or physical blowing agents are added as standard amounts for foaming processes and depending on the type of agent they range from 0.02% by weight to 20% by weight of the compound.

As chemical blowing agents the following substances can be particularly used, but they are not limited thereto:

Azodicarboamide, Oxybis, sodium bicarbonate, sodium bicarbonate and citric acid mixtures, HFC or anyway a mixture of acid and basic compounds such that they are activated at extrusion or forming temperatures of the material and are able to release gas or gas mixtures mainly composed of $CO_2$.

Physical agents can be injected into the bulk, composed of the mixture of polypropylene and vegetable flour and/or fibers, housed into the extruder and particularly into the barrel of the extruder, thus obtaining a direct foaming of the sheet during the extrusion.

As regards chemical agents they can be added to the mixture of polypropylene and vegetable flours and/or fibers into the extruder.

In such case amounts typically used for achieving predetermined foaming conditions are employed and depending on the type of agent they range from 0.02% by weight to 20% by weight of the compound.

Blowing agents are such that they are immediately and directly activated within the extruder, therefore the sheet is directly foamed contemporaneously to the extrusion of the sheet 2.

As an alternative it is possible to provide the blowing agent to be only partially activated, i.e. it generates a partial foaming during the extrusion and said foaming is completed during the forming process to which the coating sheet 2 can be subjected by the heat activation at a predetermined activation temperature of the blowing agent. The activation of the blowing agent has to occur at such a temperature that the embossed coating sheet 2 will not be completely softened.

In such case the extruded and partially foamed sheet is an intermediate product.

The fact of reducing the weight of the coating sheets is important for their processing, since it is more easy to handle them, for example in a plant forming the sheets and/or for operating personnel.

The fact of reducing the weight of the sheets is also important as regards the specific application of said sheets as, in this specific case, the coating sheet for panels for making furnishing equipment.

According to an improvement of the invention, the mixture comprises a further waterproofing component for vegetable flours and/or fibers.

Said component can be added directly to the mixture of polypropylene and vegetable fibers/flours preferably before adding the blowing agent, or the vegetable flours and/or fibers can be subjected to a preventive treatment providing said vegetable flours and/or fibers to be mixed with the waterproofing agent before mixing them with the thermoplastic polymers and with the blowing agent.

In such case the agent can be in the liquid state, that is the active component is dispersed into an acqueous or organic solvent, which solvent can be removed by drying flours/fibers, before mixing them with polypropylene and with the blowing agent: in such case a process making the vegetable component as hydrophobic can be advantageous, such as for example an acetylation process for the vegetable component for example by treating the vegetable component with acetic acid.

The fact of waterproofing vegetable flours and/or fibers prevent them from absorbing the blowing agent or gas due to their porosity, thus reducing the foaming effect of the mixture of polypropylene and vegetable filler.

In this case the polypropylene matrix having hydrophobic characteristics is not compatible with vegetable flours and/or fibers that on the contrary have hydrophilic characteristics. Thus the polypropylene matrix is not closely bonded to the vegetable flour and/or fiber filler such to coat said vegetable flours/fibers making them impermeable. Another effect of the waterproofing agents is to considerably reduce the absorption of moisture inside the sheet, thus even considerably increasing the life of the sheet.

Compatibilizing agents composed of organic molecules with hydrophilic substituents are advantageous as waterproofing agents. Organic molecules with hydrophilic substituents that is silane or organo-silane, zircoaluminate or aluminate compounds are used as compatibilizing agents.

A particular compatibilizing agent of vegetable flours and/or fibers with polyolefins is composed of an organic compound, particularly a polyolefin one with maleic anydride substituents.

Therefore said compatibilizing agents can be used also for waterproofing the vegetable filler, thus making the hydrophobic characteristic of polypropylene consistent with the hydrophilic characteristic of vegetable fillers such to make a film enclosing vegetable fibers reducing their porosity and therefore the characteristic of absorbing blowing gases, preferably before this vegetable filler comes into contact with chemical and/or physical blowing agents.

As regards compatibilizing and/or waterproofing agents they are added to the mixture in an amount ranging from 2% to 15% by weight with reference to the weight of the vegetable fiber component.

Vegetable flours and/or fibers can be of any type and particularly they are composed of wood flour.

The terms flour or powder vegetable fibers mean vegetable fibers that have been ground in order to obtain a powder therefrom whose granules have a specific granulometry.

As described above the compatibilizing and/or waterproofing agent can be mixed with the vegetable fibers even before adding said fibers to the mixture of polyolefins and powder vegetable filler.

It is also possible to mix the vegetable fibers to the powder vegetable fiber filler and to the compatibilizing and/or waterproofing agent before adding the polypropylene component. Thus advantageously there is provided a treatment able to waterproof powder vegetable fibers in addition to vegetable fibers in their not minced or crushed condition, constituting the material bulk filler and to allow the porosity of said vegetable flours and/or fibers to be reduced and so to optimize the foaming effect.

Obviously depending on whether the compatibilizing and/or waterproofing agent acts only on long vegetable fibers or both on the latter and on the powder vegetable fiber filler, that is for example on the wood flour, the amounts to be used will depend on the weight of only the long vegetable fibers or on the total weight of the latter together with filling powder vegetable fibers, that is with the wood flour.

Again a variant can provide the compatibilizing and/or waterproofing agent to be mixed separately and according to different amounts within the above mentioned amount range with cellulose fibers and with powder vegetable fibers, before mixing them together and with the polyolefin material bulk, particularly made of polypropylene.

Again according to an improvement of the invention, the mixture according to one or more of the above mentioned variants can comprise also a predetermined amount of thermoplastic rubber or thermoplastic elastomers TPEs.

By means of such thermoplastic rubber, in combination with blowing agents, the softness of the coating sheet 2 is increased and therefore the deep embossing process applied to said sheet 2 and the possible fit of the coating sheet 2 to the base sheet 1 are simplified.

A more and more important requirement is the recyclability of the material of the sheets and also the possibility of using raw materials deriving from recycling processes for manufacturing the sheets 2.

The use of vegetable flours and fibers allows the sheet to be provided with specific strength characteristics, and also to recycle the material of the sheets: in addition to the fact that vegetable flours or fibers are a raw material that can be obtained by recycling other raw materials composed of cellulose or the like, the thermoplastic rubber constituting the coating sheet 2 can derived from production waste therefore the sheet 2 and the panel, according to the present invention, have a very low environmental impact with respect to known panels used for making furniture, furnishings or the like.

Again according to an improvement a certain amount of colouring master or a mixture of colouring masters are added to the compound of the coating sheet 2 in order to give the sheet a specific colour.

According to an embodiment the compound of the coating sheet 2, depending on required mechanical characteristics, can have the following composition:

from 30% to 90% of polypropylene,
from 0 to 40% of thermoplastic rubber
from 0 to 60% of vegetable filler,
from 0 to 40% of mineral filler.

A colouring master can be added to such composition up to 10% of the total weight of the compound or as an alternative polymers previously subjected to a master process can be used to obtain the desired colour in the finished product.

According to the present invention the coating sheet made with the above compounds, besides being subjected to a possible thermoforming process it is subjected to an embossing process for example a calender embossing process, that due to the particular composition of the coating sheet 2 allows it to be very deeply embossed up to some mm particularly with a depth ranging from 200 µm to 3 µm and particularly embossing depths ranging from 500 µm to 1.5 mm.

Moreover it is possible to ennoble panels with a coating sheet 2 glued to the base sheet 1, by applying at least a decorative film 4 on its clear face allowing the aesthetic characteristics of the finished panel to be enhanced.

The decorative film 4 can be joined to the coating sheet 2 both during the manufacturing step of the embossed sheet 2 and in a subsequent step, even after joining, by gluing, said coating sheet 2 to the base sheet 1, which gives the finished panel a particular aesthetic appearance.

Therefore the process for making a panel, particularly a panel used for making furnishings, such as doors, boards, tables, furniture or the like, provides the following steps:

extruding a coating sheet 2 made of thermoplastic material,
gluing said coating sheet 2 to a rigid base sheet 1, particularly made of wood, hardboard, plywood, or the like,
embossing said coating sheet 2 before or after gluing said coating sheet 2 to said base sheet 1.

In particular due to the flexibility properties of the coating sheet 1 it is possible to provide the extrusion step for producing said coating sheet 2 and/or the step for embossing said coating sheet 2 to be continuously performed such to produce a single coating sheet 2 that can be wound on itself like a coil.

As an alternative or in combination to what described above it is possible to provide the extrusion step for producing said coating sheet 2 and/or the step for embossing said coating sheet 2 to be continuously performed but such to produce in sequence one or more coating sheets 2 precut according to predetermined dimensions.

Such precut coating sheets 2 then can adhere to one or both the faces of a base or supporting sheet 1.

Moreover it is possible to provide the embossing step to be performed during the step producing the coating sheet 2 before it adheres to the supporting sheet 1 such to have one or more coils of the coating sheet 2 which is already embossed wound on itself or to have several precut and embossed coating sheets 2 ready to adhere to one or both the faces of the base sheet 1.

Obviously due to the flexibility properties of the coating sheet 2 it is possible for said precut coating sheets 2 to be in turn wound on themselves in order to facilitate for example the transport and storage.

As an alternative it is possible to provide the embossing step to be carried out after the extrusion that is after the coating sheet 2, with or without the decorative film 4, adheres to at least one face of the base sheet 1.

Due to compressibility properties of the coating sheet 2, the deep embossing does not require the use of apparatuses capable of exerting strong pressures since the behaviour of the coating sheet with respect to the embossing process will be similar to that of a thin film even if it is thicker than a standard decorative film.

The fact that embossed coating sheets 2 can be wound makes it possible to continuously produce finished panels, with a finishing layer composed of said embossed coating sheet 2 applied thereon, by unwinding the embossed coating sheet 2 from the coil and by applying said coating sheet in a continuous manner to a continuous path of a sequence of rigid supporting panels 1. Said rigid panels 1 finished with the embossed sheet 2 can be cut according to desired dimensions.

The fact that the coating sheet 2 can be wound as a coil makes it possible to have a continuous process applying the embossed coating sheet 2 unwound from the coil to a rigid supporting sheet 1 which is then cut to measure or to a sequence of individual supporting sheets 1 that are carried one after the other under the coating sheet in order to complete the panel production.

In order to facilitate the adhesion of the coating sheet 2 to at least one face of the base sheet 1 it is possible to provide said coating sheet 2 to be locally heated at one or more locations, without completely softening the sheet which could cause it to be deformed too much, such that the face free from embossments of said coating sheet 2 can take shapes matching the base sheet 1 upon which it adheres.

The coating sheet 2 due to its flexibility properties can adhere not only to smooth surfaces but also to surfaces provided with projecting or recessed two-dimensional and/or three-dimensional structures.

Therefore the term locally heated means the heating of one or more specific areas or locations of the surface of the coating sheet 2 intended to contact and adhere to one or both the faces of the base sheet 1 such to have the coating sheet 2 not completely softened but to have one or more superficially softened and/or melted locations and/or areas thereof, at the side of the sheet 2 free from embossments and intended to adhere to the base sheet 1, in order to facilitate a chemical-physical bonding of materials constituting the base sheet 1 and the coating sheet 2.

For example it is possible to heat the coating sheet 2 at one or more locations near its perimeter such that peripheral portions of the coating sheet 2 can be folded at the corners of the base sheet 1 and can adhere to at least one side and/or end edge of the base sheet 1.

According to the present invention it is possible for the coating sheet 2, with or without the decorative film 4, to cover not only the upper and/or lower face of the base sheet 1 but also at least a side and/or end edge of said base sheet 1.

According to a first variant one or more side and/or end edges of the base sheet 1 can be covered by a coating sheet, it being embossed in an identical or different way than the coating sheet 2 covering one or both the faces of the base sheet 1, which coating sheet 2 has such dimensions to adhere to at least a part of the surface of said side and/or end edge.

The coating sheet 2 is applied to said side and/or end edges in a manner identical to or similar to those used for applying the coating sheet 2 to the upper or lower faces of the base sheet 1.

According to a further variant it is possible to provide the coating sheet 2, which has to cover the upper and/or lower face of the base sheet 1, to have a greater size than said upper and/or lower face such that, when forming the panel, said coating sheet 2 can be folded at least at one corner of the base sheet 1 and can adhere to at least a side and/or end edge of the base sheet 1, such as shown in FIG. 6.

Obviously it is possible for the coating sheet 2 to have such a size that it can be folded on the corner of the upper face and on the corner of the lower face of the base sheet 1 such that a single coating sheet 2 can wrap the base sheet 1 and can completely adhere to one of the two faces of the base sheet, to at least one side and/or end edge and at least partially to the second face of said base sheet 1.

It is possible to provide the coating sheet 2 to be made with at least a rounded edge such that when forming the panel the coating sheet 2 can cover at least one face of the base sheet 1 and said rounded portion can be, after having been locally heated, folded at the corner of the base sheet 1 such that it can adhere to the side and/or end edge of said base sheet 1.

Such as described above the coating sheet 2 is applied on the base sheet 1 by interposing a gluing layer composed of a nonwoven fabric layer 3 made of vegetable and/or synthetic fibers and/or a combination thereof.

Obviously it is possible to provide the two faces of the base sheet 1 to be glued each one to at least a coating sheet 2, each one being embossed with different patterns and depths.

The method for making said coating layer 2, for ennobling panels for making furnishings such as doors, boards, tables, furniture or the like provides said sheet 2 to be subjected not only to a calender embossing process and/or to a thermoforming process, but also to a chemical and/or physical foaming step when it is extruded.

When blowing agents are used the treatment for waterproofing the vegetable filler, particularly the vegetable fibers is particularly advantageous.

Compatibilizing agents can be used as the waterproofer.

As described above the production of the coating sheet 2 provides to mix a waterproofing and/or compatibilizing agent for polyolefins with the vegetable filler, such that said agent besides contributing to the compatibility between the non polar matrix of the polyolefin and the polar filler of the vegetable component of the sheet, it makes vegetable flours and/or fibers impermeable preventing them from absorbing the blowing agent or gas due to their porosity, with the risk of reducing the foaming effect of the mixture of polypropylene and vegetable filler. Another effect of the waterproofing agents is to considerably reduce the absorption of moisture inside the sheet, thus even considerably increasing the life of the sheet.

Some examples of compositions for the coating sheet 2 are shown below.

EXAMPLE 1

A mixture of 40% of polypropylene and 25% of vegetable flour/fiber was fed into the barrel of a co-rotating/counter-rotating extruder for making a coating sheet 2. The wood flour was previously treated with a waterproofing/compatibilizing agent composed of a maleic anhydride based organic substance.

The compatibilizing agent can be added directly into the mixture of polypropylene and wood flour/fibers.

30% by weight of thermoplastic rubber TPE and 5% by weight of a colouring master were added to the mixture.

Obviously a chemical and/or physical blowing agent can be added in order to have an extruded coating sheet 2 from the extruder directly foamed during the extrusion step.

EXAMPLE 2

A mixture of 38% of polypropylene and 20% of vegetable flour/fiber was fed into the barrel of a co-rotating/counter-rotating extruder for making a coating sheet 2. The wood flour/fiber was previously treated with a waterproofing/compatibilizing agent composed of a maleic anhydride based organic substance.

The compatibilizing agent can be added directly into the mixture of polypropylene and wood flour and/or fibers.

In addition to the vegetable filler 10% by weight of mineral filler such as talc is provided.

27% by weight of thermoplastic rubber TPE and 5% by weight of a colouring master were added to the mixture.

Obviously a chemical and/or physical blowing agent can be added in order to have an extruded coating sheet 2 from the extruder that is completely foamed directly during the extrusion step.

Therefore said coating sheets 2, in combination with decorative films, lead to the simple and inexpensive production of panels for making furniture, door boards, doors or the like, besides having a high strength level, on the external faces they have very distinct three-dimensional structures giving the finished product a pleasant aesthetic appearance.

By the present invention, it is possible to have panels produced in a continuous way, without interruptions in the manufacturing process, by simply directly applying the coating sheets 2, with or without decorative films 4, with deep embossments, on base sheets 1 made of hardboard, plywood, wood, MDF, OSB.

According to the present invention, by using a coating sheet 2 for the base sheet 1, which can be embossed by the same apparatuses and processes as those used for embossing a thin decorative film a sheet 2 is obtained thicker than a decorative film but having a face deeply embossed due to its deformability properties.

The coating sheet 2, with or without the decorative film 4, can be laminated and embossed in a continuos way from a coil or from precut sheets, in order to produce in a continuous way panels having a considerable three-dimensional effect.

Flexibility and compressibility properties allowing a rapid processing and the use of apparatuses that do not necessarily exert high pressures in order to achieve the embossing, depend on the composition of the coating sheet 2 of the present invention.

The invention claimed is:

1. A panel for furnishings, said panel comprising:
   a mechanically rigid base or supporting sheet; and
   a prefabricated coating sheet embossed with at least one three-dimensional structure on at least one face of said coating sheet for providing said panel with an aesthetic appearance, said coating sheet being superposed on at least one face of the base or supporting sheet,
   wherein said coating sheet comprises a compound including thermoplastic polymers comprising from 38% to 40% by weight of polypropylene and 27% to 30% by weight of thermoplastic rubber mixed with 20% to 25% by weight of a vegetable filler and up to 10% by weight of mineral filler, said compound providing the coating sheet with flexibility properties such that said coating sheet can be wound on itself,
   wherein the compound further comprises a compatibilizing agent selected from the group consisting of silane, organo-silane, zircoaluminate aluminate compounds and maleic anhydride-modified polyolefins,
   wherein the coating sheet has an embossing depth ranging from 200 μm to 3 mm, and
   wherein the coating sheet fully covers at least one face of the mechanically rigid base or supporting sheet.

2. The panel according to claim 1, wherein the thermoplastic polymers of the coating sheet are polyolefin-based polymers.

3. The panel according to claim 1, wherein the thermoplastic polymers of the coating sheet are composed of polypropylene, polyethylene or mixtures of said two polymers.

4. The panel according to claim 1, wherein the vegetable filler is a material selected from the group consisting of flour, long wood fibers, short wood fibers, cork flour, and vegetable fibers, wherein the vegetable fibers are selected from the group consisting of cellulose, hemp, jute, coco, kenaf, flax, ramie, abaca, sisal, curaua, palm, cabuya, opuntia, and kapok fibers.

5. The panel according to claim 1, wherein the compound further comprises a mineral filler selected from the group consisting of talc, calcium carbonate, barium sulphate, silica, and silicates or mixtures thereof.

6. The panel according to claim 1, wherein the compound further includes at least one coloring master.

7. The panel according to claim 1, wherein the compound further comprises a gas or any other physical and/or chemical blowing agent.

8. The panel according to claim 1, wherein the coating sheet has an embossing depth ranging from 500 μm to 1.5 mm.

9. The panel according to claim 1, further comprising a bonding layer between the coating sheet and the base sheet, wherein the bonding layer is selected from a group consisting of a nonwoven fabric composed of vegetable fibers, synthetic fibers, paper and any other element able to help adhesion, or a combination thereof.

10. The panel according to claim 1, further comprising a decorative film joined to an exposed face of the coating sheet.

11. The panel according to claim 1, wherein the coating sheet with or without the decorative film, covers at least a side and/or end edge of said base sheet.

12. A composite coating sheet, particularly for panels for furnishings such as doors, boards, tables, or furniture, wherein said coating sheet comprises a compound including thermoplastic polymers comprising from 38% to 40% by weight of polypropylene and 27% to 30% by weight of thermoplastic rubber mixed with 20% to 25% by weight of a vegetable filler and up to 10% by weight of a mineral filler, said compound providing the coating sheet with flexibility properties such that said coating sheet can be wound on itself,
   wherein the coating sheet has an embossed surface with depths ranging from 200 μm to 3 mm, and
   wherein the compound further comprises a compatibilizing agent selected from the group consisting of silane, organo-silane, zircoaluminate aluminate compounds and maleic anhydride-modified polyolefins.

13. The panel according to claim 1, further comprising a glueing layer composed of a layer of nonwoven fabric made of vegetable and/or synthetic fibers and/or a combination thereof wherein the glueing layer is interposed between the mechanically rigid base or supporting sheet and the prefabricated coating sheet.

* * * * *